UNITED STATES PATENT OFFICE.

MAURICE ANTHÉS, OF LONDON, ENGLAND.

REPRODUCTION OF IMAGES ON GLASS, PORCELAIN, CERAMIC, METALLIC, OR OTHER SURFACES.

959,692. Specification of Letters Patent. Patented May 31, 1910.

No Drawing. Application filed January 28, 1908. Serial No. 413,071.

*To all whom it may concern:*

Be it known that I, MAURICE ANTHÉS, of 13 Fitzroy street, Oxford Street, London, England, artist, have invented certain new and useful Improvements in or Relating to the Reproduction of Images on Glass, Porcelain, Ceramic, Metallic, or other Surfaces, of which the following is a specification.

The object of this invention is to provide a simple photographic process for the reproduction and subsequent firing of images upon glass, porcelain, ceramic, enameled metallic or other suitable surfaces, without necessity for transferring the film. According to the present invention this is rendered possible by the employment of a single sensitizing solution consisting of about one part by weight of sodium or ammonium bichromate (hereinafter called the sensitizing bichromate) in solution, about 2.5 parts by weight of water, about 2 parts by weight of honey or other soluble carbohydrate, and about eighty parts by weight of a solution of nitrocellulose miscible with water, for example, a mixture of alcohol or methylated spirit (denatured alcohol) and collodion. Potassium bichromate is practically insoluble in the mixture and is not included in the present invention. The proportions indicated are of essential importance. Instead of alcohol another liquid capable of rendering the collodion miscible with water may be employed.

By the combination of the substances above mentioned in the proportions stated, a single solution is obtained of ample sensitizing power, whereby the most artistic subjects can be reproduced in any dimensions without transfer, and with little requirement for operative skill.

Example: 40 parts by weight collodion solution (composed of 183 parts by weight of ether, 202 parts by weight methylated spirit or alcohol and 4 parts by weight of gun-cotton). 40 parts by weight of methylated spirit. 1 part by weight of ammonium or sodium bichromate. 2 parts by weight of honey or other soluble carbohydrate. The powdered bichromate and the honey are dissolved in about two and a half parts by weight of water, the spirit is added, and then the collodion solution. I do not confine myself to this particular solution, the ingredients of which may be varied within the range above indicated, and the proportions also may be altered within certain limits.

By sensitizing the desired surface with this solution and exposing it under a transparency, the latent image obtained will take up the powdered pigment or color perfectly, and reproduce every detail and shade of the transparency. I have further found that when the surface thus treated with color is washed with water, the carbohydrate and bichromate are at once entirely removed without in any way displacing the pigment, which is retained on the surface by the uniformly distributed collodion. The surface can then be at once fired to fix the pigment. A direct reproduction of the original image may thus be obtained on the desired surface.

In reproducing images with the solution I proceed as follows:—The glass, porcelain, enameled metal, or other surface to receive the impression is coated with an even film of the sensitizing solution and dried, preferably by a gentle heat until the surface ceases to be adhesive to an object placed in contact with it. The image or design is then placed in contact with the sensitized surface and exposed so that all light striking the latter first passes through the design. If this is not sufficiently transparent as for example in the case of an engraving on paper, it should be rendered so by treatment with a substance such as benzene for example. The length of the exposure depends on the intensity of the light and the density of the original design. After the exposure the surface may be gently warmed for a few minutes, and a suitable pigment or color is then dusted on and may be rubbed in with a brush. The powder will adhere to the film inversely as the action of the light has taken place. Thus it will attach itself to those portions of the surface corresponding to the dark portions of the original. The surface is then washed with water, whereby the soluble matters in the film are dissolved and removed, leaving the image in pigment or color thereon. The surface is then dried and fired.

The design to be reproduced is preferably applied to the sensitized surface face downward in order to insure perfect sharpness of line in the reproduction. The reproduced image will then of course be a laterally inverted positive and for this reason I prefer to first make a permanent transparent model of the required design as explained later.

In the firing, the collodion film left on the surface after washing is dissipated without disturbing the image and leaves no residue.

The pigment or coloring matter will vary according to the nature of the substance on which the copy is to be made. Thus for glass I may employ colors such as are employed in glass staining; for pottery, ceramic paint or pigments; for enameled metals, enamel powders.

I prefer, as before mentioned, to prepare what I style a model of the image or design to be reproduced. For this purpose I produce a replica of the desired design, in the manner hereinbefore explained, upon a sheet of glass or like transparent material. The replica may be protected if desired. This replica serves as a permanent model, convenient to handle and from which any desired number of reproductions can be made. It can be readily retouched in any way and if the work so requires, any desired portions can be easily removed by a stump or the like. The model being generally made with the image laterally inverted the picture can be reproduced direct on the desired surface in positive position by simply applying the model face downward to the surface and exposing; the procedure remaining otherwise as above explained. For the reproduction of the models I have found that ordinary lampblack for example may be used for this purpose, being taken up perfectly by the exposed surface; it is however difficult to retouch it.

The solution may be applied for the reproduction of images on wood, metallic or other surfaces in cases where it is not desired to fix the image by firing. In such cases when the surface is porous it should be enameled or coated with a suitable ground to prevent absorption of the sensitizing solution. The picture may be protected by varnishing or other suitable means.

What I claim as my invention, and desire to secure by Letters Patent is:—

1. For the reproduction of images upon glass, ceramic, metallic and other surfaces, a sensitizing solution consisting of 1 part by weight of sensitizing bichromate, 2.5 parts by weight of water, 2 parts by weight of a soluble carbohydrate, and 80 parts by weight of a solution of nitrocellulose miscible with the water present.

2. For the reproduction of images upon glass, ceramic, metallic and other surfaces, a sensitizing solution consisting of 1 part by weight of ammonium bichromate, 2.5 parts by weight of water, 2 parts by weight of a soluble carbohydrate, and 80 parts by weight of a solution of nitrocellulose miscible with the water present.

3. For the reproduction of images upon glass, ceramic, metallic and other surfaces, a sensitizing solution consisting of 1 part by weight of sensitizing bichromate, 2.5 parts by weight of water, 2 parts by weight of a soluble carbohydrate, and 80 parts by weight of a mixture of collodion and alcohol.

4. For the reproduction of images upon glass, ceramic metallic and other surfaces, a sensitizing solution consisting of one part by weight of ammonium bichromate, 2.5 parts by weight of water, 2 parts by weight of a soluble carbohydrate, and 80 parts by weight of a mixture of collodion and alcohol.

In witness whereof, I have hereunto signed my name in the presence of two subscribing witnesses.

MAURICE ANTHIÉS.

Witnesses:
REGINALD EATON ELLIS,
ROBERT MILTON SPEARPOIN